(12) United States Patent
Chang et al.

(10) Patent No.: US 9,371,416 B2
(45) Date of Patent: Jun. 21, 2016

(54) EPOXY ELASTOMER COMPOSITIONS

(71) Applicant: Dow Global Technologies LLC, Midland, MI (US)

(72) Inventors: Kwanho Chang, Lake Jackson, TX (US); Harshad M Shah, Missouri City, TX (US); Rajat Duggal, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 18 days.

(21) Appl. No.: 14/365,701

(22) PCT Filed: Dec. 20, 2012

(86) PCT No.: PCT/US2012/070977
§ 371 (c)(1),
(2) Date: Jun. 16, 2014

(87) PCT Pub. No.: WO2013/096635
PCT Pub. Date: Jun. 27, 2013

(65) Prior Publication Data
US 2014/0357813 A1    Dec. 4, 2014

Related U.S. Application Data

(60) Provisional application No. 61/578,981, filed on Dec. 22, 2011.

(51) Int. Cl.
| | | |
|---|---|---|
| *C08L 63/00* | (2006.01) | |
| *C08G 59/42* | (2006.01) | |
| *C08G 59/18* | (2006.01) | |
| *C08G 59/20* | (2006.01) | |
| *C08G 59/68* | (2006.01) | |
| *C08G 59/06* | (2006.01) | |

(52) U.S. Cl.
CPC .......... *C08G 59/4238* (2013.01); *C08G 59/066* (2013.01); *C08G 59/184* (2013.01); *C08G 59/20* (2013.01); *C08G 59/42* (2013.01); *C08G 59/686* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 3,288,881 A | 11/1966 | Lee, Jr. | |
| 3,686,359 A | 8/1972 | Soldatos et al. | |
| 4,088,708 A * | 5/1978 | Riew | C08L 63/00 428/414 |
| 4,497,945 A | 2/1985 | Salloum et al. | |
| 5,140,068 A * | 8/1992 | Siebert | C08F 36/04 525/108 |
| 7,759,435 B2 | 7/2010 | Burns et al. | |
| 2007/0265427 A1 | 11/2007 | Takai et al. | |
| 2013/0131217 A1 | 5/2013 | Karunakaran et al. | |

FOREIGN PATENT DOCUMENTS

| | | |
|---|---|---|
| WO | 2011024014 | 3/2011 |
| WO | 2012030338 | 3/2012 |
| WO | 2012030339 | 3/2012 |
| WO | 2012050688 | 4/2012 |

OTHER PUBLICATIONS

International Search Report and Written Opinion for related PCT Application PCT/US2012/070977, mailed Oct. 31, 2013 (11 pgs).

* cited by examiner

*Primary Examiner* — Robert Sellers
(74) *Attorney, Agent, or Firm* — Brooks, Cameron & Huebsch, PLLC

(57) ABSTRACT

An epoxy terminated prepolymer formed as a reaction product of a cycloaliphatic epoxide resin and an amine terminated polymeric polyol, and a catalyst that promotes the reaction of the cycloaliphatic epoxide resin and the aminated polyol. The epoxy terminated prepolymer and an anhydride hardener react to form an epoxy elastomer composition having a microphase separated morphology of hard particles, formed with the anhydride hardener reacted with the epoxy terminated prepolymer, dispersed in a soft continuous phase formed from polymeric polyol in the epoxy terminated prepolymer.

15 Claims, 4 Drawing Sheets

EPOXY ELASTOMER COMPOSITIONS

This application is a National Stage Application under 35 U.S.C. §371 of International Application Number PCT/US2012/070977, filed Dec. 20, 2012 and published as WO 2013/096635 on Jun. 27, 2013, which claims the benefit to U.S. Provisional Application 61/578,981, filed Dec. 22, 2011, the entire contents of which are incorporated herein by reference in its entirety.

FIELD OF DISCLOSURE

The present disclosure relates generally to epoxy compositions, and more particularly to epoxy elastomer compositions.

BACKGROUND

Epoxy compositions are formed, at a minimum, from an epoxy resin and a hardener. The epoxy resin can include one or more epoxide groups, while the hardener can include a variety of structures that react with the epoxide group. These two components chemically react, or "cure," to form a cured epoxy product. Upon curing the epoxy composition forms a highly cross-linked thermoset.

Cured epoxy compositions can have a variety of properties. These properties can depend upon the choice of epoxy resin, hardener, ratio of components, reaction conditions and additives, if any, present in the epoxy composition. For high temperature applications, the choice of these components can help to achieve the desired result. There are applications, however, where in addition to withstanding high temperatures, the cured epoxy composition also needs to be tough. One such example would be for application in the automotive industry. Here, not only would the cured epoxy composition need to withstand high temperatures, but also need to be flexible and have the ability to absorb energy and elastically or plastically deform without fracturing (i.e., have toughness).

Thus, an epoxy composition having the toughness, flexibility along with the ability to withstand high temperatures is needed in the art.

SUMMARY

Embodiments of the present disclosure provide an epoxy elastomer composition that can maintain its integrity and mechanical strength (e.g., toughness and flexibility) at elevated temperatures, such as those of at least 50° C., while remaining elastic. Specifically, embodiments of the present disclosure include an epoxy elastomer composition and a method of forming the epoxy elastomer composition.

The epoxy elastomer composition includes an epoxy terminated prepolymer and an anhydride hardener that reacts with the epoxy terminated prepolymer to form the epoxy elastomer composition. The epoxy elastomer composition has a microphase separated morphology of hard particles, formed with the anhydride hardener reacted with the epoxy terminated prepolymer, dispersed in a soft continuous phase formed from the epoxy terminated prepolymer. The microphase separated morphology provides the cured epoxy elastomer composition with two or more glass transition temperatures. Specifically, the hard particles formed with the anhydride hardener have a glass transition temperature (Tg) that is greater than the Tg of the soft continuous phase formed from the epoxy terminated prepolymer. The microphase separated morphology also provides the epoxy elastomer composition with improved mechanical strength.

The epoxy terminated prepolymer is formed from a reaction product of a cycloaliphatic epoxide resin and an amine terminated polymeric polyol or an amine terminated butadiene acrylonitrile. A catalyst can be used to promote the reaction of the cycloaliphatic epoxide resin and the aminated polyol. The amine terminated polymeric polyol can have a variety of structures. Examples include where the amine terminated polymeric polyol is a primary or secondary amine terminated polymeric polyol, where the amine terminated polymeric polyol is an amine terminated polyether polyol and/or where the amine terminated polymeric polyol is an amine terminated polyester polyol.

The method of forming the epoxy elastomer composition includes forming the epoxy terminated prepolymer, as provided herein, and reacting the epoxy terminated prepolymer with the anhydride hardener to form the epoxy elastomer composition with the microphase separated morphology of the hard particles dispersed in the soft continuous phase, as provided herein.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

" (FIG. 4B).

DETAILED DESCRIPTION

Figure 1:
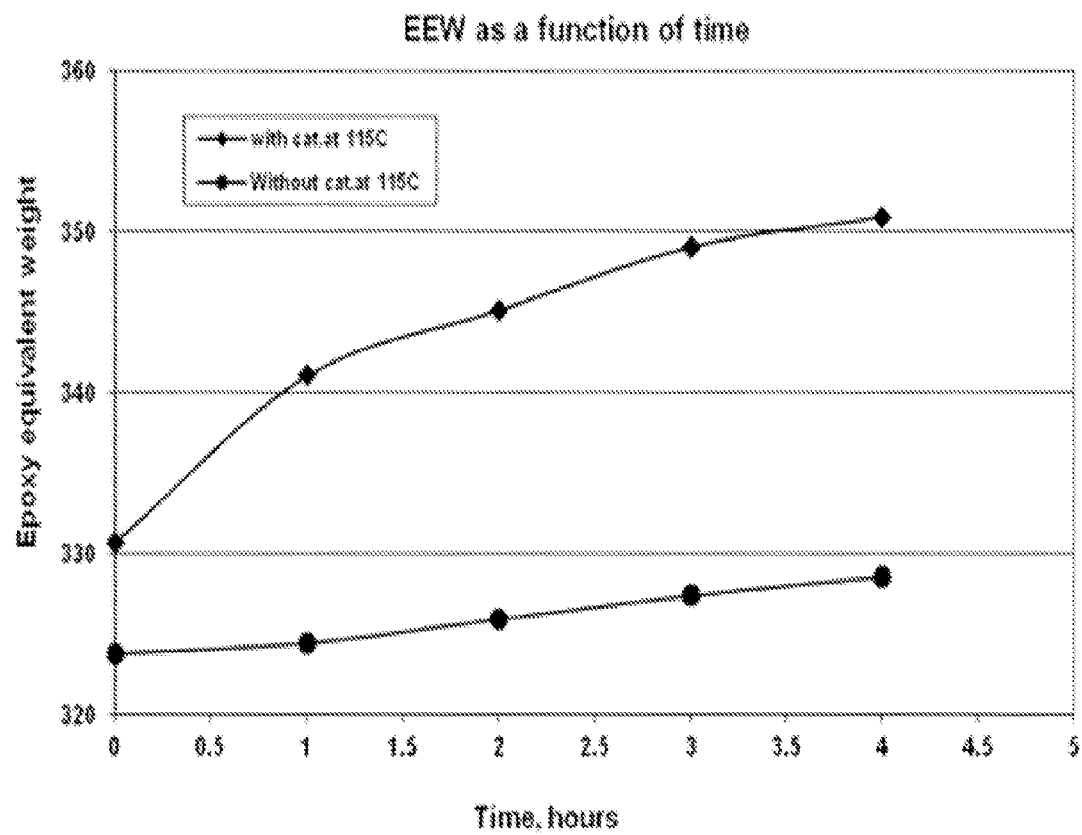
FIG. 1 illustrates the effect of a catalyst on epoxy equivalent molecular weight (EEW) in preparing the epoxy terminated prepolymer of the present disclosure.

Embodiments of the present disclosure provide an epoxy elastomer composition with desirable glass transition (Tg) temperatures and mechanical properties due to the formation of microphase separated morphology. The presence of the microphase separated morphology is evident due to the presence of two Tgs for the epoxy elastomer composition. The epoxy elastomer composition of the present disclosure reacts an epoxy terminated prepolymer with an anhydride hardener to form the epoxy elastomer composition. The epoxy terminated prepolymer is a reaction product of a cycloaliphatic epoxide resin and an amine terminated polymeric polyol, where a catalyst is used to promote the reaction of the cycloaliphatic epoxide resin and the aminated polyol.

For the various embodiments, the molecular weight of the epoxy terminated prepolymer is low enough to form a homogeneous mixture with the anhydride hardener before cure, but high enough to induce phase separation as the epoxy elastomer composition cures. The phase separation results in a microphase separated morphology of hard particles, formed with the anhydride hardener reacted with the epoxy terminated prepolymer, dispersed in a soft continuous phase formed from polymeric polyol in the epoxy terminated prepolymer. The microphase separated morphology helps to improve the mechanical properties (e.g., toughness and flexibility) of the epoxy elastomer composition while also having a Tg sufficiently high to meet high temperature applications, such temperatures in a range from ambient (23 degrees Celsius (° C.)) to 170° C.

The use of the epoxy-terminated prepolymer in forming the epoxy elastomer composition helps the epoxy terminated prepolymer create the microphase separated morphology, which enhances the mechanical properties of the epoxy elastomer composition. As a result, the epoxy elastomer composition can have a $T_g$ of 170° C. or higher depending upon the type of anhydride used in the reaction.

The epoxy terminated prepolymer of the present disclosure includes the reaction product of the cycloaliphatic epoxide resin and the amine terminated polymeric polyol or an amine terminated butadiene acrylonitrile, where a catalyst is used to promote the reaction of the cycloaliphatic epoxide resin and the aminated polyol or the amine terminated butadiene acrylonitrile. The amine terminated polymer polyol may be an amine terminated polyether polyol. The amine terminated polymer polyol may be an amine terminated polyester polyol. The amine terminated polymer polyol may also be a combination of a primary amine terminated polyether polyol and an amine terminated polyester polyol along with the amine terminated butadiene acrylonitrile.

The cycloaliphatic epoxide resin of the present disclosure represents alicyclic epoxy resin that contains two carbon atoms in the epoxide constituting an alicyclic skeleton unlike glycidyl ether. The most common alicyclic skeleton is cyclohexane but various examples of the alicyclic epoxy structure are displayed in U.S. Pat. Pub 2008/0272328, which is incorporated herein in its entirety.

Examples of the cycloaliphatic epoxide resin are selected from the group consisting of 3,4-epoxycyclohexylmethyl 3,4-epoxycyclohexanecarboxylate, bis(3,4-epoxycyclohexyl methyl) adipate, 1,4-cyclohexanedimethanol bis(3,4-epoxycyclohexanecarboxylate), dicyclopentadiene dioxide, 3,3'-(1-methylethylidene)bis-7-oxabicyclo[4.1.0]heptane, and a combination thereof. Additional examples can be found in U.S. Pat. Pub 2007/0265427, to Takai et al., which is incorporated herein by reference.

Other specific examples of the cycloaliphatic epoxide resin include those having the general formula (1):

$$X-Y-X \quad (I)$$

Where X represents an epoxy moiety selected from the group consisting of:

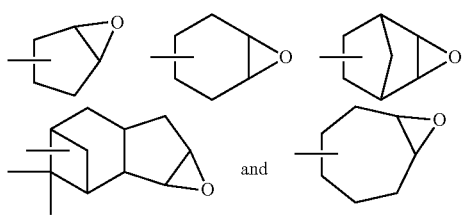

And where Y represents a linkage group. Examples of Y are single bond, a linear or branched divalent hydrocarbon group, carbonyl group (—(C=O)—), ether bond (—O—), ester bond (—(C=O)—O—), amide bond (—(C=O)—NH—), carbonate bond (—O—(C=O)—O—), and a group comprising two or more of these groups combined with each other. Such examples can be prepared by oxidizing corresponding alicyclic olefin compounds typically with an aliphatic percarboxylic acid.

Another example of a suitable cycloaliphatic epoxy resin includes:

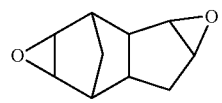 [SMILES: C1C2OC2C2C1C1CC2C2OC12]

The amine terminated polymeric polyol of the present disclosure can include those having a primary amine functional group, a secondary amine functional group and a combination thereof. Preferably, the amine terminated polymeric polyol includes primary amine functional groups. The amine terminated polymeric polyol includes from 2 to 6 amine functional groups. In one embodiment, the amine terminated polymeric polyol includes 3 amine functional groups.

The amine terminated polymeric polyol used in the epoxy terminated prepolymer also has an amine equivalent weight ("AEW" which is the molecular weight of amine divided by the number of active hydrogens in the molecule) that is low enough to allow for a homogenous reaction mixture to be formed during an early stage of the reaction, but that is also high enough to induce a phase separation of the polymeric polyol in a later stage of the reaction that forms the epoxy terminated prepolymer. For the various embodiments, the amine terminated polymeric polyol has an AEW of at least 500 grams/mole (g/mol).

More specifically, values for the AEW include those from 500 g/mol to 6000 g/mol. All individual values and subranges from 500 g/mol to 6000 g/mol are included; for example, the AEW can be from a lower limit of 500 g/mol, 1000 g/mol or 1500 g/mol to an upper limit of 2000 g/mol, 4000 g/mol, 5000 g/mol or 6000 g/mol. Specific examples include a Mn of the amine terminated polymeric polyol from 500 g/mol to 2000 g/mol; from 500 g/mol to 4000 g/mol; from 500 g/mol to 5000 g/mol; from 1000 g/mol to 2000 g/mol; from 1000 g/mol to 4000 g/mol; from 1000 g/mol to 5000 g/mol; from 1000 g/mol to 6000 g/mol; from 1500 g/mol to 2000 g/mol; from 1500 g/mol to 4000 g/mol; from 1500 g/mol to 5000 g/mol; and from 1500 g/mol to 6000 g/mol. The AEW can be determined by ISO 9702.

Examples of the amine terminated polyether polyols can include those having a polyether backbone formed from the group consisting of ethylene oxide, propylene oxide, butylene oxide, tetramethylene ether glycol and a combination thereof. Amination of the polyether polyol can occur in a number of ways including reaction with ammonia or another amine by way of a reductive alkylation or reductive amination.

The use of commercially available primary amine terminated polyether polyols is also possible. Examples of primary amine terminated polyether polyols that are commercially available include, but are not limited to, those sold under the trade designator JEFFAMINE® T5000, JEFFAMINE® T3000, JEFFAMINE® D4000, JEFFAMINE® D2000, JEFFAMINE® SD2001 and a combination thereof.

Examples of the amine terminated polyester polyol include, but are not limited to, those having a polyester backbone formed from the reaction of aliphatic or aromatic diacids including adipic acid, glutaric acid, succinic acid, azelaic acid, caprolactone, phthalic anhydride and terephthalic acid with glycols including 1,4-butanediol, diethylene glycol, ethylene glycol, 1,6-hexanediol, neopentyl glycol, propylene glycol, trimethylolproprane, pentaerythritol and polytetramethylene ether glycol. Amination of the polyester polyol can occur in a number of ways including reaction of diacids with excess amine.

Examples of the amine terminated butadiene acrylonitrile include, but are not limited to, those having a butadiene acrylonitrile backbone with the range of an amount of acrylonitrile up to 26 weight percent % of the amine terminated butadiene acrylonitrile.

The use of commercially available primary amine terminated butadiene acrylonitrile is also possible. Examples of primary amine terminated butadiene acrylonitrile that are commercially available include, but are not limited to, those sold under the trade designator Hypro 2000X173, Hypro 1300X21, Hypro 1300X16, Hypro 1300X35 and a combination thereof.

The catalyst used to promote the reaction of the cycloaliphatic epoxide resin and the aminated polyol can include those selected from the group consisting of methyl p-toluene sulfonate, ethyl p-toluene sulfonate, 2,4,6-tri-(dimethylaminemethyl)Phenol, 1,8-Diazabicyclo[5.4.0]undec-7-ene and a combination thereof. An amount of the catalyst used can be in a range from 0.1 weight percent (wt. %) to 5 wt. % based on the total weight of the reaction mixture of cycloaliphatic epoxide resin, the amine terminated polymeric polyol and the catalyst. In one embodiment, the amount of catalyst used is 0.5 wt. % based on total weight of the reaction mixture.

The epoxy terminated prepolymer reaction product can be formed using a molar ratio of the cycloaliphatic epoxide resin to the amine terminated polymeric polyol in a range of from 1:1 to 10:1. All individual values and subranges of the molar ratio from 1:1 to 10:1 are included; for example, the molar ratio of the cycloaliphatic epoxide resin to the amine terminated polymeric polyol can be from a lower limit of 1:1, 2:1, 3:1 or 5:1 to an upper limit of 8:1, 9:1 or 10:1. In one embodiment, a molar ratio of the cycloaliphatic epoxide resin to the amine terminated polymeric polyol is 5:1. In one embodiment, the molar ratio of the cycloaliphatic epoxide resin to the amine terminated polymeric polyol in a range of from 1:1 to 5:1.

The epoxy terminated prepolymer is formed as the reaction product of the cycloaliphatic epoxide resin and the amine terminated polymeric polyol in the presence of the catalyst that promotes the reaction of the cycloaliphatic epoxide resin and the aminated polyol to form the epoxy terminated prepolymer. For a given molar ratio, a predetermined amount of the cycloaliphatic epoxide resin can be charged into a reactor. The reactor environment can be purged with an inert gas (e.g., nitrogen) to provide an inert environment. The cycloaliphatic epoxide resin can be heated to a temperature of at least 80° C. up to 150° C. For example the cycloaliphatic epoxide resin can be heated to a temperature in a range from temperature 110° C. to 115° C. The pressure for the reaction can be atmospheric pressure.

The catalyst is mixed with the cycloaliphatic epoxide resin and the amine terminated polymeric polyol is added to form the reaction mixture. The progress of the reaction can be monitored by testing the epoxy equivalent weight (EEW) of the reaction mixture, where the quantitative EEW can be calculated from the initial amount of cycloaliphatic epoxide resin. Examples of suitable testing methods for EEW include ASTM D1652-04 among others. Preferably, in forming the epoxy terminated prepolymer all (e.g., 100 percent) of the primary amines of the amine terminated polymeric polyol react with the cycloaliphatic epoxide resin. In other words, the amine terminated polymeric polyol has no primary amines. In an alternative embodiment, at least 95 percent of the primary amines of the amine terminated polymeric polyol react with the cycloaliphatic epoxide resin in forming the epoxy terminated prepolymer of the present disclosure.

The epoxy terminated prepolymer of the present disclosure can have a viscosity that is in a range from 1000 to 20000 centipoise (cP) at ambient temperature as measured using a TA Instruments AR2000 stress-controlled rheometer at a steady shear rate of 1 s$^{-1}$ by employing 50 mm parallel plates with 800 µm gap at 23° C. It is observed that the viscosity can decrease as the molar ratio of the cycloaliphatic epoxide resin to the amine terminated polymeric polyol increases.

The epoxy terminated prepolymer of the present disclosure is then used to form the epoxy elastomer composition of the present disclosure. Specifically, the present disclosure includes forming the epoxy elastomer composition, as discussed herein, and reacting the epoxy terminated prepolymer with an anhydride hardener to form the epoxy elastomer composition of the present disclosure. As discussed herein, a catalyst can be used to promote the reaction of the epoxy terminated prepolymer with the anhydride hardener to form the epoxy elastomer composition.

A variety of anhydride hardeners, preferably liquid anhydride hardeners, can be used in forming the epoxy elastomer composition. For example, the anhydride hardener can be selected from the group consisting of nadic methyl anhydride, methylhexahydrophthalic anhydride, maleic anhydride, hexahydrophthalic anhydride, methyltetrahydrophthalic anhydride, tetrahydrophthalic anhydride, dodecenyl succinic anhydride, phthalic anhydride, trimellitic anhydride, phenylsuccinic anhydride, methylsuccinic anhydride, 2-octen-1-yl-succinic anhydride, dimethylsuccinic anhydride, and a combination thereof.

Similarly, a variety of catalysts can be used to promote the reaction of the epoxy terminated prepolymer with the anhydride hardener to form the epoxy elastomer composition. For example, the catalyst can be selected from the group consisting of 1-methylimidazole, 2-ethyl-4-methylimidazole, 1-benzyl-2methyl imidazole, benzyldimethyl amine, benzyltriethyl ammonium chloride, and a combination thereof.

The epoxy elastomer composition of the present disclosure has a microphase separated morphology that includes epoxy hard particles, which are formed with the anhydride hardener when it reacts with the epoxy terminated prepolymer, dispersed in a soft continuous phase formed from the epoxy terminated prepolymer. This enables the epoxy elastomer composition to have at least two Tg values along with the intrinsic flexibility. The terms hard and soft are used herein relative to each other, where the hard particles formed with the epoxy and anhydride hardener have a glass transition temperature (Tg) that is greater than the Tg of the soft continuous phase formed from the epoxy terminated prepolymer. Tg values provided herein are measured using Differential Scanning Calorimetry (DSC).

The epoxy elastomer composition can be formed using a molar ratio of the epoxy terminated prepolymer to the anhydride hardener in a range from 2:1 to 1:1. All individual values and subranges of the molar ratio from 2:1 to 1:1 are included; for example, the molar ratio of the epoxy terminated prepolymer to the anhydride hardener can be from a lower limit of 1.0, 1.1, or 1.2 to an upper limit of 1.7, 1.8, 1.9 or 2.0

An amount of the catalyst used can be in a range from 0.1 weight percent (wt. %) to 5 wt. % based on the total weight of the epoxy terminated prepolymer and the anhydride hardener and the catalyst. In one embodiment, the amount of catalyst used is 0.5 wt. % based on total weight of the reaction mixture.

The epoxy elastomer composition, as disclosed herein, may be cured to obtain a product. The epoxy elastomer composition can be cured at a cure temperature greater than the Tg of epoxy hard particles, typically in a range from 100° C. to 200° C. All individual values and subranges from 100° C. to 200° C. are included; for example, the cure temperature can be from a lower limit of 100° C., 110° C., or 115° C. to an upper limit of 170° C., 190° C. or 200° C. Specific examples include a cure temperature in a range from 100° C. to 170° C., 100° C. to 190° C., 110° C. to 170° C., 110° C. to 190° C., 110° C. to 200° C., 115° C. to 170° C., 115° C. to 190° C. and 115° C. to 200° C.

It is also possible to cure the epoxy elastomer composition in a step wise process, where the cure temperature changes (e.g., increases) during the course of the curing process. For example, the epoxy elastomer composition can be cured using a curing temperature that starts initially at 100° C., then after a predetermined time increases to 150° C., then after a second predetermined time increases to 200° C. A final cure temperature used in the step process used in forming the epoxy elastomer composition can depend upon the Tg of the hard particles in the epoxy elastomer composition. For example, the final cure temperature can be at or just above the Tg value of hard particles of the epoxy elastomer composition. In an additional embodiment, the final cure temperature can be at least equal to the Tg of the hard particles of the epoxy elastomer composition. Completion of the curing step can be confirmed with DSC measurements.

For one or more embodiments, the epoxy elastomer compositions may include an additive. Examples of additives include, but are not limited to, nonreactive and reactive diluents; catalysts; fibers; fillers; aggregates; pigments; viscosity reducing agents; dyes; coloring agents; thixotropic agents; photo initiators; latent photo initiators, latent catalysts; inhibitors; flow modifiers; accelerators; surfactants; adhesion promoters; fluidity control agents; stabilizers; ion scavengers; UV stabilizers; fire retardants; toughening agents; wetting agents; mold release agents; coupling agents; tackifying agents, and a combination thereof. For various applications differing amounts of the additive may be employed.

EXAMPLES

In the Examples, various terms and designations for materials were used including, for example, the following: 3,4-epoxycyclohexylmethyl 3,4-epoxycyclohexanecarboxylate (ERL4221, a cycloaliphatic epoxide resin, available from Synasia), JEFFAMINE® T-5000 (an amine terminated polymeric polyol, available from Huntsman International LLC), methyl p-toluene sulfonate (MPTS, catalyst to promote the reaction of the cycloaliphatic epoxide resin and the aminated polyol, available from Sigma-Aldrich), nadic methyl anhydride (NMA, an anhydride hardener available from Dixie Chemical), methylhexahydrophthalic anhydride (MHHPA, an anhydride hardener available from Sigma-Aldrich), maleic anhydride (MA, an anhydride hardener available from Sigma-Aldrich), and 1-methylimidazole (catalyst that promotes the reaction of the anhydride hardener and the epoxy terminated prepolymer, available from Sigma-Aldrich).

Example (Ex) 1

Synthesis of an Epoxy Terminated Prepolymer

Prepare Ex 1, an epoxy Terminated Prepolymer of the present disclosure, as follows. Charge 100.924 grams (g) of ERL4221 (equivalent weight 126.1550) into a 500 milliliter (mL) four-neck round bottom flask (flask) having a dripping funnel, a mechanical stirrer, a heater and a wire thermocouple. Charge 152.320 g of JEFFAMINE® T-5000 (equivalent weight 952.0000) into the dripping funnel. Heat the content of the flask to 115° C. under nitrogen atmosphere. Add 1.3 g of the MPTS catalyst to contents of the flask. Add the JEFFAMINE® T-5000 drop wise over 1 hour to the contents of the flask with stirring. After adding the JEFFAMINE® T-5000 hold the contents of the flask at 115° C. under nitrogen atmosphere for 3 hours. For Ex 1 the molar ratio of the cycloaliphatic epoxide resin to the amine terminated polymeric polyol is 5:1.

Take and analyze a sample of the contents of the round bottom flask for EEW every hour over the 4 hours or until the EEW reaches its calculated EEW value. Total reaction time is approximately 12 hours (overnight). Cool the contents of the flask to 80° C. and discharged the cycloaliphatic epoxy terminated prepolymer of Ex 1 into a glass jar.

Comparative Example (ComEx) A

Prepare ComEx A as follows. Repeat Ex 1 except do not add MPTS catalyst to contents of the flask.

FIG. 1 illustrates the effect of the catalyst on epoxy equivalent molecular weight (EEW) in preparing the Epoxy Terminated Prepolymer (Ex 1) of the present disclosure as compared to not using the catalyst (ComEx A). As illustrated, preparing the Epoxy Terminated Prepolymer of the present disclosure with the catalyst achieves a higher EEW more quickly than preparing the Epoxy Terminated Prepolymer without the catalyst.

Ex 2

Epoxy Elastomer Composition

Prepare Ex 2 of the Epoxy Elastomer Composition of the present disclosure as follows. Charge the epoxy terminated prepolymer of Ex 1, the anhydride hardener (NMA) and the 1-methylimidazole catalyst in the amounts provided in Table 1 (below) into a FlackTek™ SpeedMixer™ cup. The molar ratio of Epoxy Terminated Prepolymer and the anhydride hardener is 1.1:1.

Mix the contents of the cup for 30 seconds at 800 rotation per minute (RPM), followed by 1 minute at 2350 rpm. Pour the contents of the cup into a mold having a 6.5"×6.5"×0.05" square window spacer positioned between two Duofoil aluminum sheets supported with outer steel plates. Place the filled mold in an oven and cure using the following schedules: 60° C. for 1 hour, 80° C. for 1 hour, and 150° C. for 2 hour. Demold the cured plaque.

Ex 3

Epoxy Elastomer Composition

Prepare Ex 3 of the Epoxy Elastomer Composition of the present disclosure as follows. Repeat the procedure for Ex 2 except replace the NMA anhydride hardener with MHHPA as the anhydride hardener as provided in Table 1.

Ex 4

Epoxy Elastomer Composition

Prepare Ex 4 of the Epoxy Elastomer Composition of the present disclosure as follows. Repeat the procedure for Ex 2 except replace the NMA anhydride hardener with MA as the anhydride hardener as provided in Table 1.

TABLE 1

Formulation of Epoxy Elastomer Compositions Ex 2-4

|  | Ex 2 | Ex 3 | Ex 4 |
|---|---|---|---|
| Epoxy Terminated Prepolymer of Ex 1 | 34.46 g | 35.24 g | 40.05 g |
| NMA | 14.0 g | | |
| MHHPA | | 13.3 g | |
| MA | | | 8.95 g |
| 1-methylimidazole | 0.5 g | 0.5 g | 0.5 g |

Performance Results of Exs 2-4

Determine Dynamic Mechanical Analysis (DMA) for Exs 2-4 using a TA Instruments ARES strain-controlled rheometer via a torsion test. Specimens were cut out into a rectangular strip with dimension of 16.965 mm×6.88 mm. Dynamic temperature sweeps were conducted with 10% strain and 1 Hz frequency between −100 and 250° C. Tensile strength and elongation at break were determined by pulling dog bone specimens at a crosshead speed of 5 in/min according to ASTM D-1708 for Exs 2-4. Other tensile properties were determined according to ASTM D-1708. The results are shown in Table 2.

Figure 2:
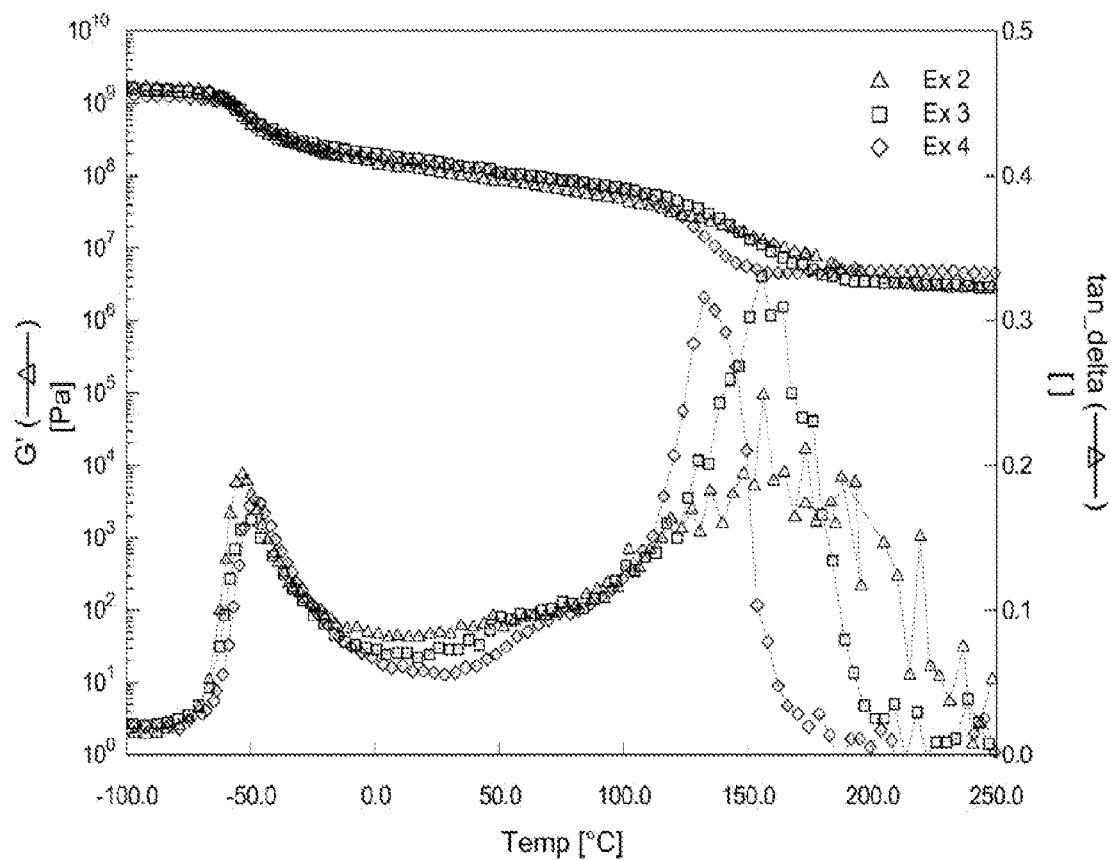
FIG. 2 shows the dynamic mechanical analysis of Examples of the Epoxy Elastomer Composition of the present disclosure.

FIG. 2 shows the dynamic mechanical analysis of Exs 2-4 of the Epoxy Elastomer Composition of the present disclosure. FIG. 2 illustrates that each of the epoxy elastomer composition of Exs 2-4 has a microphase separated morphology indicated by the presence of two separate Tg's. As illustrated in FIG. 2, $T_g$ of the soft continuous phase was −48° C., which is consistent with that of JEFFAMINE® T-5000, whereas that of the hard particles was responsive of the type of anhydride. The highest $T_g$ of 173° C. was obtained with NMA. Also, well defined rubbery plateaus of $10^8$ Pascals (Pa) in the elastic modulus can be observed between −30° C. and 110° C. for all of Exs 2-4 plaques. It is notable that the hard particle $T_g$'s were actually decreased from the original values between the epoxy (ERL4221) and the anhydride. For instance, the $T_g$ of the thermoset made with ERL4221 and NMA in the absence of JEFFAMINE® T-5000 is up to 240° C. However, at the expense of $T_g$, the tensile properties were significantly improved as shown in Table 2. The tensile strength reaches 16-18 MPa with an elongation of approximately 70%. The tensile data for the Ex 4 cured plaque is missing because of tiny bubbles trapped in the plaque, but is presumable within the range of other samples.

TABLE 2

Summary of tensile properties and $T_g$ of cycloaliphatic epoxy elastomer

| Properties | Ex 2 | Ex 3 | Ex 4 |
|---|---|---|---|
| Tensile Strength (MPa) | 16 ± 1 | 18 ± 1 | Not Measured |
| Elongation (%) | 67 ± 5 | 77 ± 8 | Not Measured |
| Elastic Modulus (MPa) | 280 ± 30 | 350 ± 20 | Not Measured |
| Tg | −48° C./173° C. | −48° C./152° C. | −48° C./133° C. |

Dielectic Constant (∈')

The dielectric constant of the Epoxy Elastomer Composition of Ex 3 was studied using a broadband dielectric spectrometer across a frequency range of $1 \times 10^{-2}$ Hz to $3 \times 10^9$ Hz at ambient temperature (23° C.). The results are shown in Table 3.

TABLE 3

Dielectric Constant Values of the Epoxy Elastomer Composition of Ex 3

| Frequency (Hz) | $\epsilon^I$ (dielectric constant) | $\epsilon^{II}$ (loss factor) |
|---|---|---|
| $1 \times 10^{-2}$ | 14.9 | 191 |
| $1 \times 10^0$ | 5.17 | 2.05 |
| $1 \times 10^3$ | 4.52 | 0.084 |
| $1 \times 10^6$ | 4.12 | 0.152 |
| $1 \times 10^9$ | 2.93 | 0.185 |

Exs 5-9

Synthesis of an Epoxy Terminated Prepolymer

Prepare Exs 5-9 of the Epoxy Terminated Prepolymer of the present disclosure as follows. Prepare Exs 5-9 by repeating the procedure for Ex 1 except use the amounts of ERL4221, JEFFAMINE® T-5000 and MPTS as provided in Table 4. The amount of the MPTS catalyst was fixed at 0.5 wt % for each of Exs 5-9.

TABLE 4

Formulation of Epoxy Terminated Prepolymer of Ex 5-9

|  | Ex 5 | Ex 6 | Ex 7 | Ex 8 | Ex 9 |
|---|---|---|---|---|---|
| Molar Ratio of cycloaliphatic epoxide resin (ERL4221) to the amine terminated polymeric polyol (JEFFAMINE ® T-5000) | 4:1 | 3.5:1 | 3:1 | 2:1 | 1:1 |
| ERL4221 | 85.76 g | 75.04 g | 64.32 g | 42.88 g | 21.44 g |
| JEFFAMINE ® T-5000 | 152.32 g | 152.32 g | 152.32 g | 152.32 g | 152.32 g |
| MPTS | 1.3 g | 1.2 g | 1.1 g | 1.0 g | 0.9 g |

Exs 10-13

Synthesis of Epoxy Compositions

Prepare Exs 10-13 of the Epoxy Elastomer Composition of the present disclosure as follows. Repeat the procedure for Ex 2 except replace the Epoxy Terminated Prepolymer of Ex 1 with the Epoxy Terminated Prepolymer of Exs 5-8 and the NMA anhydride hardener with MHHPA as the anhydride hardener as provided in Table 5.

Figure 3:
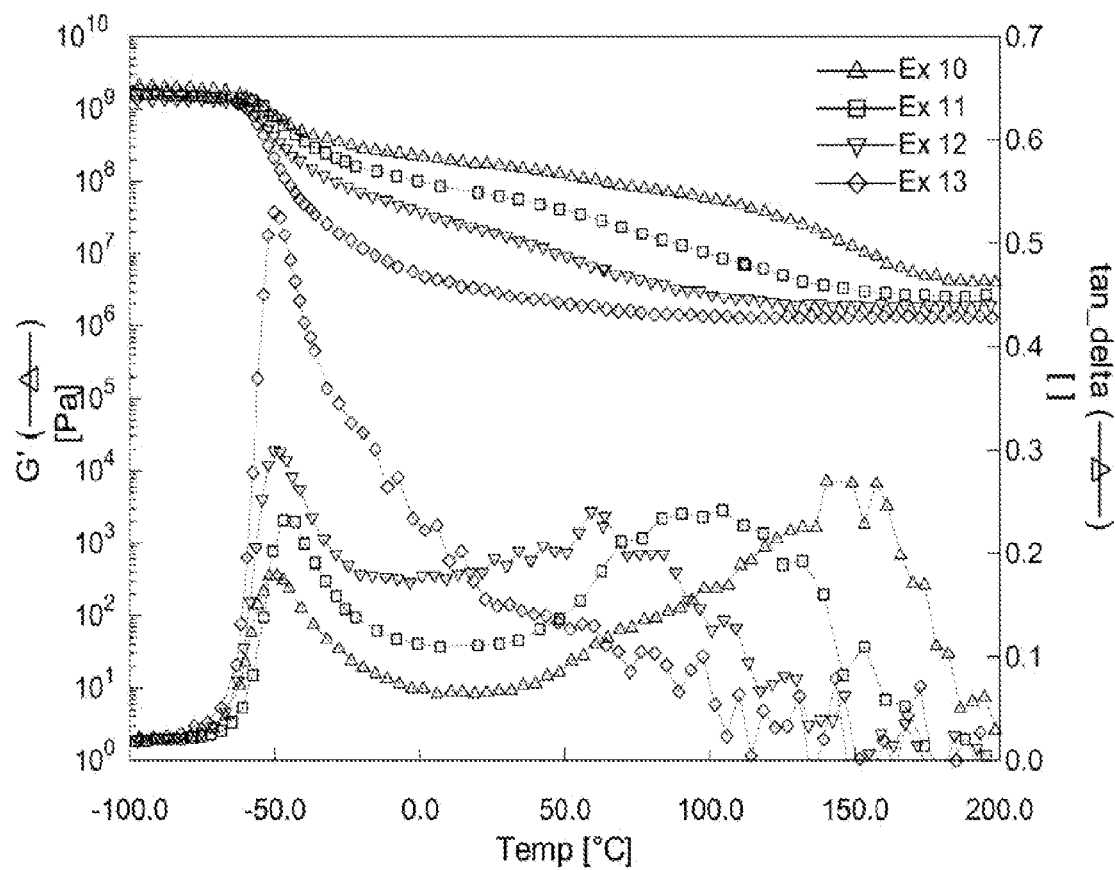
FIG. 3 shows the dynamic mechanical analysis of Examples of the Epoxy Elastomer Composition of the present disclosure.

The physical properties and dynamic mechanical analyses of Epoxy Elastomer Compositions Ex 10-13 are provided in Table 6 and FIG. 3, respectively. Determine Dynamic Mechanical Analysis (DMA) for Exs 10-13 using the TA Instruments ARES strain-controlled rheometer via a torsion test. Testing was conducted as described for Exs 2-4, above. The results are shown in Table 6 and in FIG. 3. Measure Shore A hardness with a CHECKLINE digital multi-scale durometer in accordance with ASTM D-2240. The durometer employed for the measurements has a model #RX-DD-MS.

The data shows that the tensile properties and the Tg are the sensitive function of the epoxy to Jeffamine molar ratio. As the molar ratio of the cycloaliphatic epoxide resin to the amine terminated polymeric polyol increases, the Tg and the tensile strength systematically increase at the expense of the elongation. Therefore, the performance of the epoxy elastomer compositions of the present disclosure can be modulated depending upon the application requirements.

TABLE 5

Formulation of Epoxy Elastomer Compositions Ex 10-13

|  | Ex 10 | Ex 11 | Ex 12 | Ex 13 |
|---|---|---|---|---|
| Epoxy Terminated Prepolymer | 73.20 g of Ex 5 | 77.17 g of Ex 6 | 56.06 g of Ex 7 | 59.63 g of Ex 8 |
| MHHPA | 26.80 g | 22.83 g | 13.94 g | 10.37 g |
| 1-methylimidazole | 1.0 g | 1.0 g | 0.7 g | 0.7 g |

TABLE 6

Summary of Physical Properties of Epoxy Elastomer Compositions Ex 10-13

|  | Molar Ratio of cycloaliphatic epoxide resin (ERL4221) to the amine terminated polymeric polyol (JEFFAMINE ® T-5000) | Cure temp (° C.) | Tg (° C.) | Tensile Strength (MPa) | Elongation (%) | Hardness |
|---|---|---|---|---|---|---|
| Ex 10 | 4:1 | 200 | 147 | 15 | 75 | 98A |
| Ex 11 | 3.5:1 | 150 | 91 | 10.4 | 95 | 96A |
| Ex 12 | 3:1 | 150 | 59 | 6.3 | 105 | 89A |
| Ex 13 | 2:1 | 150 | na | 2.1 | 93 | 70A |

Comparison of Properties of Epoxy Elastomer Compositions Prepared with an Epoxy Terminated Prepolymer and Epoxy Elastomers Prepared in a "One Pot Reaction"

Prepare Ex 10 of the Epoxy Elastomer Composition of the present disclosure as shown in Table 5. In comparison, prepare ComEx B (epoxy elastomer prepared in a "One Pot Reaction") as follows. Repeat the procedure for Ex 10 except all components of Ex 10 were added together simultaneously and directly cured in a "one pot reaction" (without the synthesis of the Epoxy Terminated Prepolymer).

Polish a sample of each of Ex 10 and ComEx B under cryogenic conditions using a Leica UCT/FCS microtome operated at −140° C. Cut thin sections (about 160 nm) from each sample and place on a mica surface for Atomic Force Microscopy (AFM) analysis. Topography and phase images were captured at ambient temperature (23° C.) using a Digital Instruments (now Bruker) Multi-Mode AFM system with a Mikromasch probe. The probe has a spring constant of 40 N/m and a resonant frequency in the vicinity of 170 kHz. Use an imaging frequency of 0.5-2 Hz with a set point ratio of ~0.8.

Figure 4A:
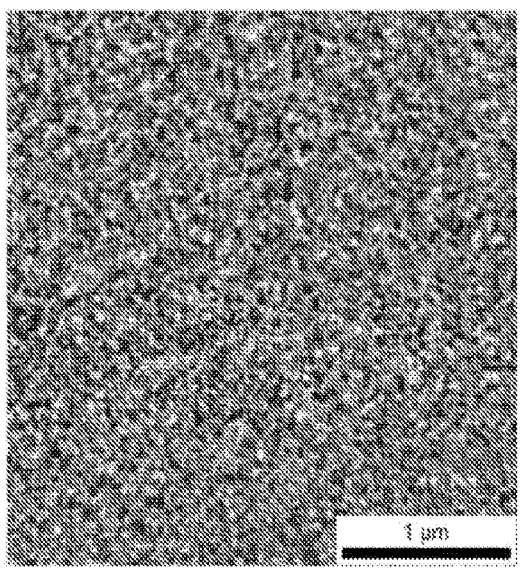
FIGS. 4A and 4B are Atomic Force Microscopy phase images of an Epoxy Elastomer Composition (prepared with an Epoxy Terminated Prepolymer) of the present disclosure (FIG. 4A) and an epoxy elastomer prepared in a "One Pot Reaction.
Figure 4B:
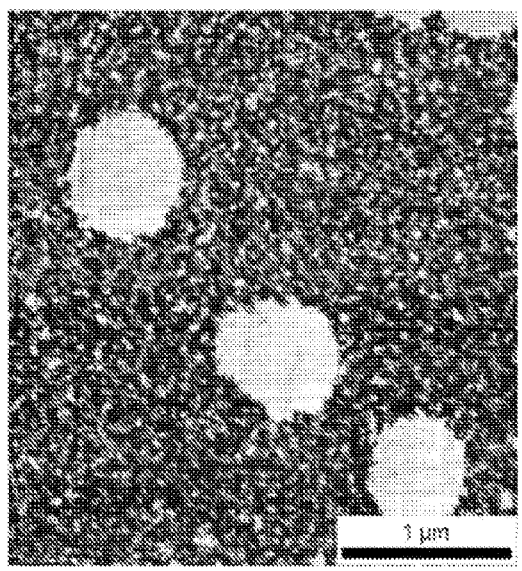

FIGS. 4A and 4B illustrate the AFM phase images of Ex 10 (FIG. 4A) and ComEx B (FIG. 4B). As illustrated in FIGS. 4A and 4B, ComEx B produced epoxy hard domains which macrophase separated from the soft continuous phase whereas Ex 10 (Epoxy Elastomer Composition prepared with the Epoxy Terminated Prepolymer of the present disclosure) produced the microphase separated hard domains up to 60 nm. The morphology difference also affects the physical properties of resulting elastomers. Table 7 shows superior tensile properties of Ex 10 compared to ComEx B (epoxy elastomer prepared in a "One Pot Reaction").

TABLE 7

Comparison of the Properties of Epoxy Elastomers Prepared from Prepolymer Synthesis and from One Pot Reaction.

|  | Use of Epoxy Terminated Prepolymer of present disclosure? | Tensile Strength (MPa) | Elongation (%) | Hardness |
|---|---|---|---|---|
| Ex 10 | Yes | 15 | 75 | 98A |
| ComEx B | No | 7.4 | 57 | 91A |

What is claimed:

1. An epoxy elastomer composition, comprising:
   a reaction product of a cycloaliphatic epoxide resin and an amine terminated polymeric polyol, the cycloaliphatic epoxide resin and the amine terminated polymeric polyol having a molar ratio in a range from 1:1 to 10:1;
   a catalyst that promotes the reaction of the cycloaliphatic epoxide resin and the aminated polyol to form an epoxy terminated prepolymer, where the catalyst is present in an amount from 0.1 wt. % to 5 wt. % based on the total weight of the cycloaliphatic epoxide resin, the amine terminated polymeric polyol and the catalyst; and
   an anhydride hardener, where the anhydride hardener reacts with the epoxy terminated prepolymer to form the epoxy elastomer composition.

2. The epoxy elastomer composition of claim 1, where the amine terminated polymeric polyol has from 2 to 6 amine functional groups and an amine equivalent weight of 500 g/mol to 6000 g/mol as determined according to ISO 9702.

3. The epoxy elastomer composition of claim 1, where the amine terminated polymeric polyol is an amine terminated polyether polyol.

4. The epoxy elastomer composition of claim 1, where the amine terminated polymeric polyol is an amine terminated polyester polyol.

5. The epoxy elastomer composition of claim 1, where the reaction product is formed with a molar ratio of the cycloaliphatic epoxide resin to the amine terminated polymeric polyol in a range of from 1:1 to 5:1.

6. The epoxy elastomer composition of claim 1, where the cycloaliphatic epoxide resin is selected from the group consisting of 3,4-epoxycyclohexylmethyl 3,4-epoxycyclohexanecarboxylate, bis(3,4-epoxycyclohexyl methyl) adipate, 1,4-cyclohexanedimethanol bis(3,4-epoxycyclohexanecarboxylate), dicyclopentadiene dioxide, 3,3'-(1-methylethylidene)bis-7-oxabicyclo[4.1.0]heptane, and a combination thereof.

7. The epoxy elastomer composition of claim 1, where epoxy elastomer composition has a molar ratio of the epoxy terminated prepolymer to the anhydride hardener in a range from 2:1 to 1:1.

8. The epoxy elastomer composition of claim 1, where the anhydride hardener is selected from the group consisting of nadic methyl anhydride, methylhexahydrophthalic anhydride, maleic anhydride, hexahydrophthalic anhydride, methyltetrahydrophthalic anhydride, tetrahydrophthalic anhydride, dodecenyl succinic anhydride, phthalic anhydride, trimellitic anhydride, phenylsuccinic anhydride, methylsuccinic anhydride, 2-octen-1-ylsuccinic anhydride, dimethyl succinic anhydride and a combination thereof.

9. The epoxy elastomer composition of claim 1 where the catalyst is selected from the group consisting of 1-methylimidazole, 2-ethyl-4-methylimidazole, 1-benzyl-2methyl imidazole, benzyldimethyl amine, benzyltriethyl ammonium chloride, and a combination thereof.

10. The epoxy elastomer composition of claim 1, where the epoxy elastomer composition has a microphase separated morphology of hard particles, formed with the anhydride hardener reacted with the epoxy terminated prepolymer, dispersed in a soft continuous phase formed from the epoxy terminated prepolymer.

11. The epoxy elastomer composition of claim 1, where the hard particles formed with the anhydride hardener have a glass transition temperature (Tg) that is greater than the Tg of the soft continuous phase formed from the epoxy terminated prepolymer.

12. A method of forming an epoxy elastomer composition, comprising:
forming an epoxy terminated prepolymer from a reaction of a cycloaliphatic epoxide resin and an amine terminated polymeric polyol in the presences of a catalyst that promotes the reaction of the cycloaliphatic epoxide resin and the amine terminated polymeric polyol; and
reacting the epoxy terminated prepolymer with an anhydride hardener to form the epoxy elastomer composition.

13. The method of claim 12, where forming the epoxy terminated prepolymer includes reacting all primary amines on the amine terminated polymeric polyol with the cycloaliphatic epoxide resin.

14. The method of claim 12, where reacting the epoxy terminated prepolymer with the anhydride hardener includes forming a microphase separated morphology of hard particles, formed with the anhydride hardener reacted with the epoxy terminated prepolymer, dispersed in a soft continuous phase formed from the epoxy terminated prepolymer.

15. The method of claim 12, where reacting the epoxy terminated prepolymer with the anhydride hardener includes curing the epoxy elastomer composition at a temperature at least equal to a glass transition temperature of the hard particles.

\* \* \* \* \*